United States Patent [19]

Nakada et al.

[11] 4,113,239
[45] Sep. 12, 1978

[54] APPARATUS FOR COOLING SLAG

[75] Inventors: Tetsuro Nakada, Chiba; Makoto Shimizu, Yokosuka; Mayumi Yoshinaga, Takarazuka, all of Japan

[73] Assignees: Ishikawajima-Harima Jukogyo Kabushiki Kaisha, Ote; Sumitomo Metal Industries, Ltd., Osaka, both of Japan

[21] Appl. No.: 864,252

[22] Filed: Dec. 27, 1977

[51] Int. Cl.² ........................................... F27D 15/02
[52] U.S. Cl. .................................... 266/137; 266/201
[58] Field of Search .................... 75/24; 266/137, 164, 266/201, 215, 195, 196, 172

[56] References Cited

U.S. PATENT DOCUMENTS 3,374,999   3/1968   Burch .................................... 266/137

Primary Examiner—Gerald A. Dost
Attorney, Agent, or Firm—Scrivener, Parker, Scrivener & Clarke

[57] ABSTRACT

Molten slag is impinged against a target, for instance a rotary drum, gets itself granulated as it rebounces on the target surface, and is charged into a fluidized bed consisting of solid particles and gas so that slag granules may be quickly cooled without damaging the shape.

8 Claims, 1 Drawing Figure

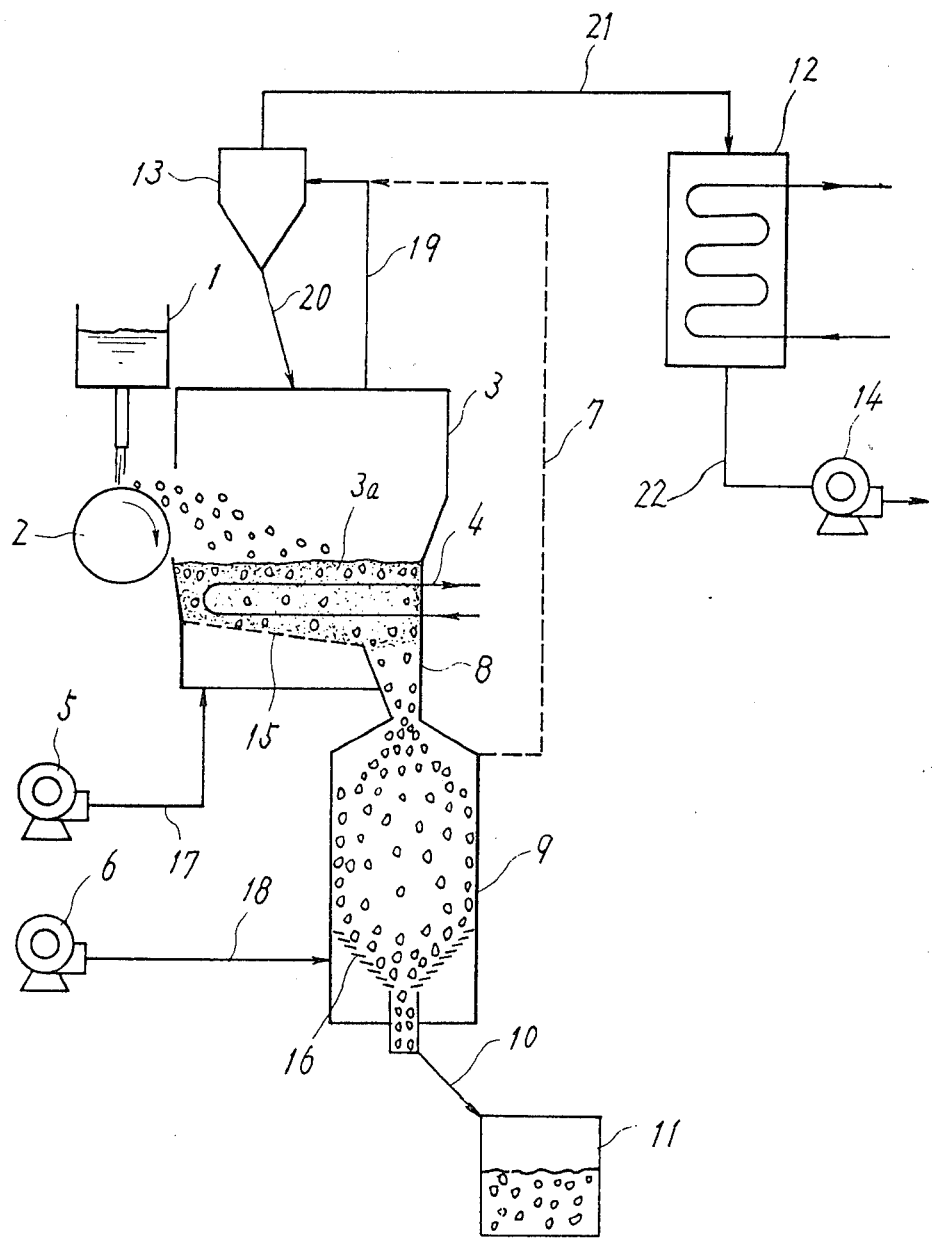

APPARATUS FOR COOLING SLAG

DETAILED DESCRIPTION OF THE INVENTION

In the refining of various metals such as iron, high temperature slag is discharged from the furnace. If properly converted into particular form, this slag may be commercially advantageously used as concrete aggregate, but the slag discharged from a furnace is extremely high in temperature so that it must be cooled.

Various methods have been used for cooling high temperature slag while converting it a particular form. A first method is to let the slag fall into water; a second method is to let the slag fall into a high temperature liquid; a third method is to utilize air cushion; and a fourth method is to let the slag fall into a body of solid particles. The first method is advantageous in that since a body of water serves as a cushion the slag may be prevented from being subjected to mechanical impacts, but is apparently disadvantageous in that since slag is quickly cooled to a temperature lower than 100° C., it becomes powdery because of thermal shocks and consequently its commercial value is lost. The second method, which is an application of the annealing and quenching used in the manufacture of steel, uses a heated oil or high temperature molten salt bath. As a result not only this method is economically disadvantageous but also the post-treatment for removing oil or salt adhered to slag aggregate is required for avoiding the pollution problem. In the third method of cooling high temperature slag particles through the flow of cooling gas, unless the slag particles are uniform in particle size, the flow control is difficult. Furthermore, the temperature control is also difficult because of the low heat conduction between the cooling gas and the slag particles. More particularly, as the heat capacity of cooling gas is far lower than the heat capacity of slag, a large volume of cooling gas must be brought into contact with slag, and as the thermal conductivity between the gas and the surfaces of the slag particles is low, in order to prevent the slag particles from being melted to stick each other coalescing, they must be cooled at a considerably high cooling rate when they are in a high temperature range (about 1,200° C. in case of iron making slag) while they must be cooled at a relatively low cooling rate at a low temperature range (approximately 1,000° C. in case of iron making slag) where the slag is susceptible to thermal shock. However in practice it is extremely difficult to satisfy both of these conditions simultaneously. According to the fourth method, the body of solid particles serves as a cushion for avoiding mechanical impacts. After the heat of slag is absorbed by the solid particels, both of them are discharged together and separated from each other in a separator. However the body of solid particles serves as a thermal insulator so that the temperature in the vicinity of slag particles rises, resulting in the melting of slag particles and solid particles and consequent aggregation thereof. Furthermore the body of solid particles containing slag particles cannot be uniformly discharged and a part of the mixture always gets held up. In general, it is extremely difficult to cause a mixture of particles of varied sizes to uniformly flow downward in a vessel.

The present invention therefore has for its object to provide an apparatus for cooling slag once converted into particular, more specifically granular, form which may substantially overcome the above and other problems encountered in the prior art apparatus.

The present invention will become apparent from the following description of one preferred embodiment thereof taken in conjunction with the accompanying drawing;

in which a single FIGURE is a diagram of an apparatus for cooling slag granules in accordance with the present invention.

Referring to the single FIGURE, a rotary drum 2 which is disposed immediately below the nozzle of a tundish 1 is rotated by a suitable prime mover in the direction indicated by the arrow so that slag granules being formed at the drum surface 2 may be charged into a fluidized bed type cooler 3 through its opening adjacent to the periphery of the rotary drum 2. A perforated gas distributor 15 is gradually inclined at an angle between about 5° and 10° from the side adjacent to the rotary drum 2 to a classifying pipe 8. A heat-exchange tubing 4 is disposed within the cooler 3 and above the gas distributor 15 so that the heat-exchange may be effected between a cooling medium flowing through the heat-exchange tubing 4 and a fluidized bed 3a which consists of semi-molten slag granules charged from the rotary drum 2, pulverized solid particles such as silica sand, graphite, alumina, lime stone and the like and gas to be described below.

The cooler 3 is connected through the classifying pipe 8 to a moving-bed type heat-exchanger 9 with an inverted cone-shaped gas distributor 16. The heat-exchanger 9 is connected through a slag granule discharge pipe 10 to a slag granule storage 11.

A blower 5 which is disposed below the cooler 3 is connected through a duct 17 to the cooler 3 for feeding gas into the fluidized bed 3a. Disposed above the cooler 3 is a cyclone 13 for separating the slag granules and silica sand from the gas discharged from the cooler 3 through a duct 19 and the slag particles and silica sand separated therein are returned through a return duct 20 into the cooler 3. The cyclone 13 is communicated through a duct 21 to a heat-exchanger 12 for recovering waste heat which in turn in connected through a duct 22 to a blower 14.

A blower 6 is disposed below the heat-exchanger 9 and communicated therewith through a duct 18 for feeding gas into moving bed in the heat-exchanger 9. The upper zone of the heat-exchanger 9 is communicated through a bypass duct 7 with the duct 19.

Next the mode of operation will be described. Molten slag in the tundish 1 is discharged through the nozzle to impinge against the rotary drum 2, gets itself granulated as it rebounces on the drum surface, and is dispersed and charged into the fluidized bed 3a through the opening of the cooler 3. The gas which is introduced through the duct 17 from the blower 5 flows through the perforations of the gas distributor 15 into the fluidized bed 3a so as to keep the bed in the fluidized state. The gas receives the heat from the fluidized bed 3a which in turn derives the heat from the slag particles so that the gas is heated to a temperature nearly equal to the temperature of the fluidized bed 3a.

The slag granules fall into the fluidized bed 3a without encountering any mechanical impacts and are quickly cooled by the gas and the pulverized solid particles of the fluidized bed 3a to a temperature nearly equal to the temperature thereof.

The slag granules and other particles are carried by the gas discharged from the cooler 3 through the duct 19 into the cyclone 13. They are separated from the gas in the cyclone 13 and returned through the duct 20 into the cooler 3 while the gas flows from the cyclone 13 through the duct 21 into the heat-exchanger 12. The gas which has been cooled in the heat-exchanger 12 is discharged through the duct 22 and the blower 14 into the surrounding atmosphere.

The slag granules move toward the classifying pipe 8 along the inclined gas distributor 15 while being mixed with the solid particles of the fluidized bed 3a.

The gas is charged by the blower 6 through the duct 18 and the gas distributor 16 into the moving bed in the heat-exchanger 9, and flows upward through the slag granules into the classifying pipe 8 and then into the cooler 3. In the classifying pipe 8, the gas flows faster than the gas in the fluidized bed 3a, and the particle size of the solid particles of the bed is less than about one half of the size of the slag granules. As a result at the inlet of the classifying pipe 8 aerodynamical classification is performed to separate the slag granules and the solid particles from each other so that only the slag granules continue to fall through classifying pipe 9 into the heat-exchanger 9 while being cooled by the upwardly flowing gas from the heat-exchanger 9. The slag granules thus cooled are discharged through the discharge pipe 10 into the storage 11. The adjustment of the particle size classification of slag granules is made by adjusting the degree of opening of a damper (not shown) disposed in the bypass duct 7 so that the flow rate of the gas bypassed through the duct 7 may be suitably adjusted.

The temperature of the fluidized bed 3a may be controlled by the number of the heat-exchange tubing 4, the volume of gas bypassed through the duct 7 from the heat-exchanger 9 to the duct 19 and the volume of the gas discharged from the blower 5 into the cooler 3. Therefore the slag granules may be prevented from being broken by thermal impacts and from being melted to coalesce.

In the fluidized bed 3a, the gas charged from the heat-exchanger 9 through the classifying pipe 8 into the cooler 3 is mixed with the gas charged into the cooler 3 by the blower 5, then, flows into the cyclone 13 through the duct 19, gets separated therein from the slag granules and other particles, and flows into the heat-exchanger 12, cooled and discharged through the duct 22 and the blower 14 into the surrounding atmosphere in the manner described above. The gas which has been bypassed through the duct 7 is treated in the same manner.

In the preferred embodiment of the present invention, the rotary drum 2 is used in order to effect the granulation of the molten slag, but it is to be understood that any suitable means may be employed instead of the rotary drum and that various modifications may be effected within the principles of the present invention.

The advantages of the apparatus for cooling slag particles in accordance with the present invention may be summarized as follows:

(1) While converting high temperature slag into a useful granular substance of value which may be advantageously used as aggregate, its heat is effectively recovered. Thus the apparatus may attain considerably high saving in energy.

(2) The cooling gas may be selected dependent upon the characteristics and properties of slag to be treated, and even the recirculation of the cooling gas is possible. As a result the waste or discharged gas may be reduced considerably in volume so that poisonous gas and dust pollution problems may be easily avoided.

(3) The fluidized bed prevents the slag particles from being subjected to mechanical impacts, and as the heat capacity of a fluidized bed is several hundred times as high as the heat capacity of slag particles or of the cooling gas, the temperature variation in the fluidized bed due to the variation in the feed of slag particles and cooling gas is minimized for the fluidized bed to be continuously maintained at a constant temperature suitably selected to forestall the breaking-up of slag granules due to thermal shock.

(4) As the effective thermal conductivity of slag particles within the fluidized bed is of the order of several hundred Kcal/$m^2$hr° C., even when slag particles are charged molten or semi-molten into the fluidized bed, their surfaces are quickly solidified to prevent the mutual coalescence.

(5) Because of the active movements of particles in the fluidized bed, the fluidized bed may be maintained at an almost uniform temperature throughout, in particular at an optimum intermediate temperature which satisfies simultaneously the two apparently contradictory conditions, one to avoid the thermal impacts and the other to cause quick solidification of the surfaces of slag particles.

We claim:

1. An apparatus for cooling slag comprising a device for converting molten slag into slag granules, a fluidized bed type cooler with a fluidized bed of solid particles through which passes gas, a moving bed type heat-exchanger which is communicated with the bottom of said cooler and which has a moving bed of slag granules through which passes gas, and a classifying pipe interconnecting between said cooler and said heat-exchanger for classifying the slag granules from solid particles of said fluidized bed.

2. An apparatus as set forth in claim 1 wherein said device for converting molten slag into slag granules is a rotary drum.

3. An apparatus as set forth in claim 1 wherein a heat-exchange tubing through which flows a heat-exchange medium is disposed within said fluidized bed in said cooler.

4. An apparatus as set forth in claim 2 wherein a heat-exchange tubing through which flows a heat-exchange medium is disposed within said fluidized bed in said cooler.

5. An apparatus as set forth in claim 1 further comprising a cyclone for separating slag granules and other solid particles carried by the gas discharged from said cooler and returning them to said cooler, and heat-exchange means for recovering the heat from the gas discharged from said cyclone.

6. An apparatus as set forth in claim 2 further comprising a cyclone for separating slag granules and other solid particles carried by the gas discharged from said cooler and returning them to said cooler, and heat-exchange means for recovering the heat from the gas discharged from said cyclone.

7. An apparatus as set forth in claim 3 further comprising a cyclone for separating slag granules and other solid particles carried by the gas discharged from said cooler and returning them to said cooler, and heat-exchange means for recovering the heat from the gas discharged from said cyclone.

8. An apparatus as set forth in claim 4 further comprising a cyclone for separating slag granules and other solid particles carried by the gas discharged from said cooler and returning them to said cooler, and heat-exchange means for recovering the heat from the gas discharged from said cyclone.

* * * * *